Nov. 7, 1950  F. P. J. H. DUMONT  2,529,379
ARRANGEMENT FOR THE CONTROL OF
A VARIABLE-SPEED MECHANISM
Filed Dec. 2, 1948  6 Sheets-Sheet 1
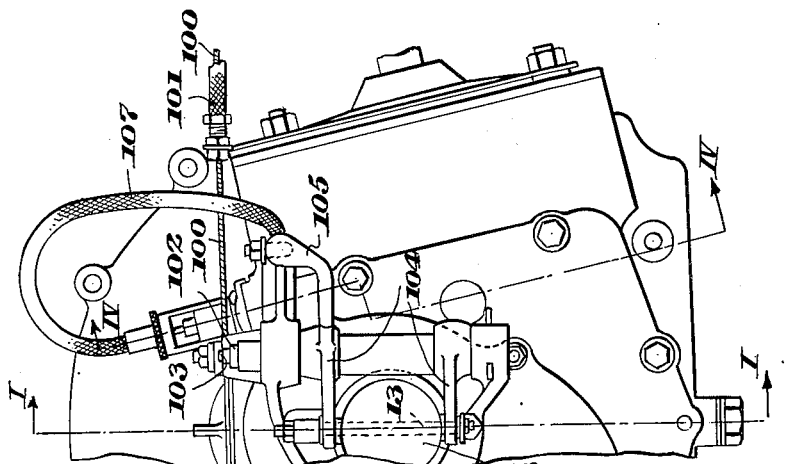
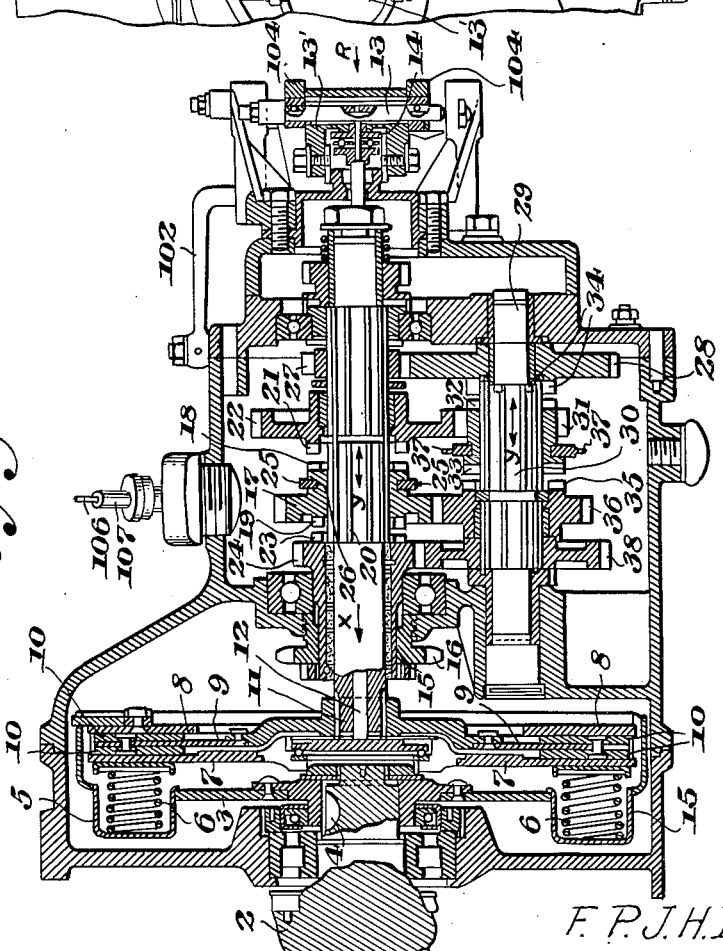
INVENTOR
F. P. J. H. Dumont
BY Wenderoth, Lind & Ponack
ATTORNEYS

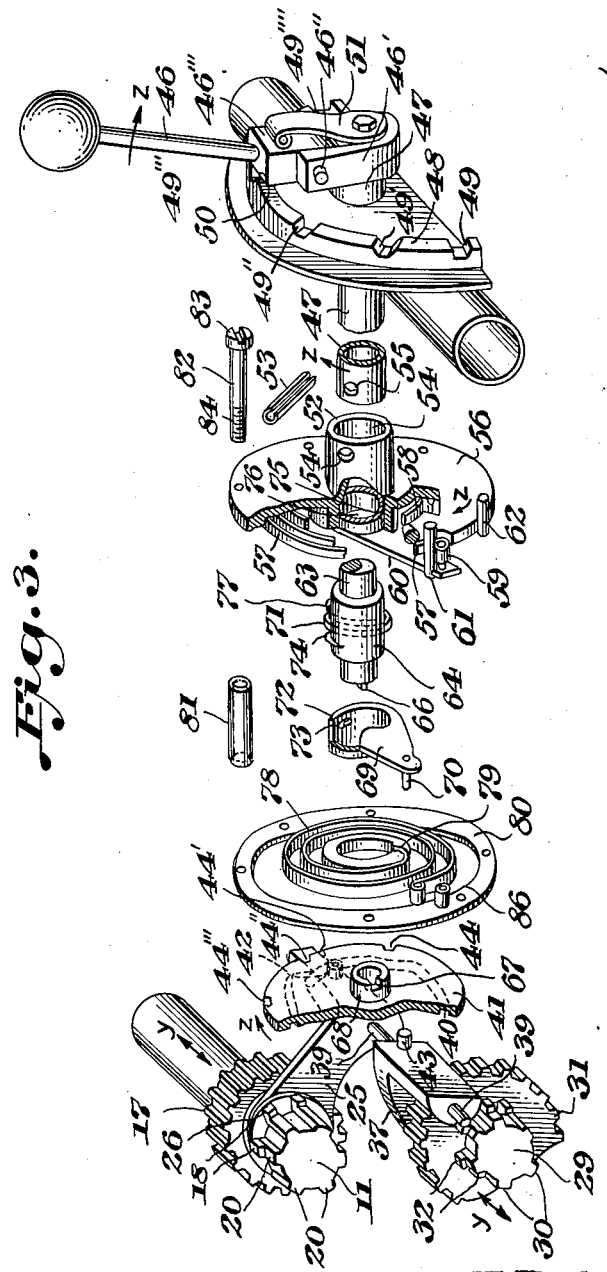

Nov. 7, 1950  F. P. J. H. DUMONT  2,529,379
ARRANGEMENT FOR THE CONTROL OF
A VARIABLE-SPEED MECHANISM
Filed Dec. 2, 1948  6 Sheets-Sheet 3
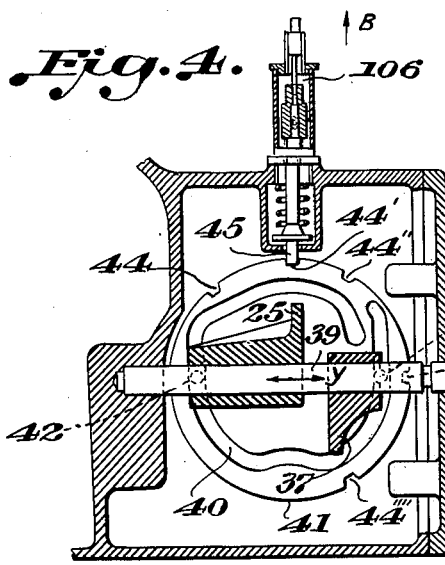
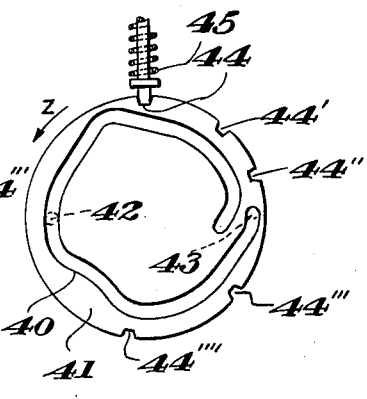
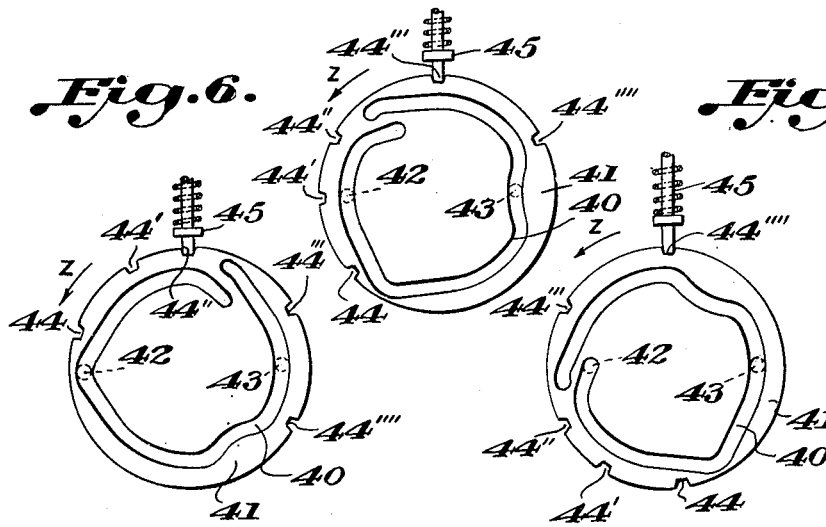
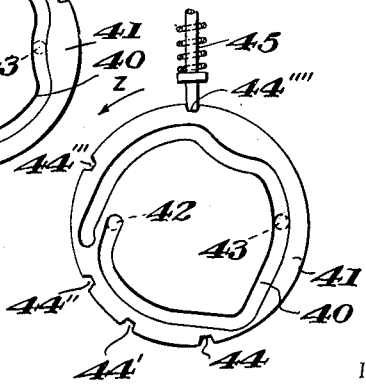
INVENTOR
F. P. J. H. Dumont
BY Wenderoth, Lind & Ponack
ATTORNEYS

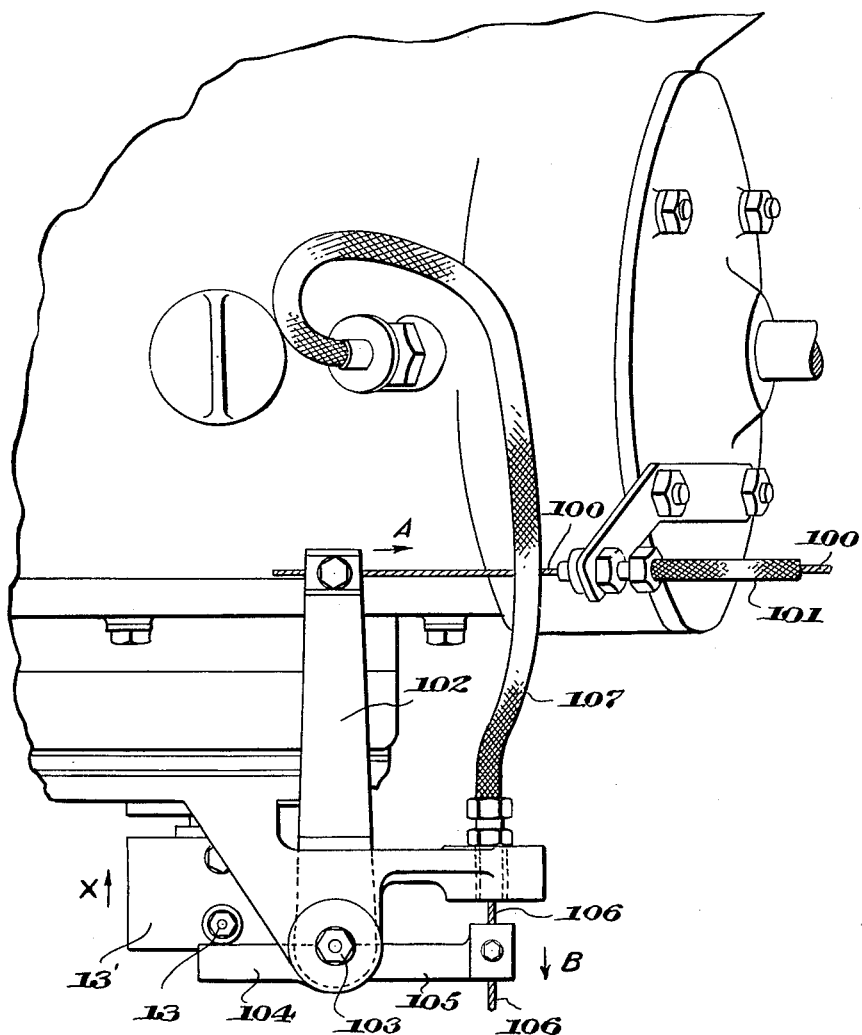

Patented Nov. 7, 1950

2,529,379

UNITED STATES PATENT OFFICE 2,529,379

ARRANGEMENT FOR THE CONTROL OF A VARIABLE-SPEED MECHANISM

François Pierre Joseph Hector Dumont, Jambes, Belgium

Application December 2, 1948, Serial No. 63,042
In Belgium August 12, 1948

8 Claims. (Cl. 192—3.5)

This invention relates to an arrangement for the control of a variable-speed mechanism which is disposed between a clutch mechanism and a driven shaft, said arrangement comprising between a member for operating the variable-speed mechanism, which is within reach of the user, and a cam serving to drive at least one member having a reciprocating motion which forms part of the variable-speed mechanism, at least one spring placed under load by the operation of the aforesaid member but prevented from actuating the variable-speed mechanism until the instant when a locking member which holds the aforesaid cam fast and which is connected to the member controlling the de-clutching of the aforesaid clutch mechanism is disengaged from its locking position under the action of the said last member at the instant when the de-clutching takes place.

With the object of enabling preparatory action to be taken for an alteration in the speed ratio between the output shaft of the clutch mechanism and the driven shaft without interrupting the transmission of the driving motion at this instant, and with the further object of automatically producing the alteration in the speed ratio during the de-clutching of the clutch mechanism, the applicant has already produced an arrangement of this nature in which the operating member is constituted by an axially movable rod which is connected to a cylinder adapted to slide with respect to another rod which is situated in the extension of the first rod and which is connected by a complex assemblage of mechanical connections to the aforesaid cam. Since in practice the two rods are almost parallel to the pivoting axis of the cam, the aforesaid mechanical connection must include a number of bell-crank levers in order to convert a reciprocating axial movement of the second rod into an alternating rotational movement of the cam. The reciprocating translational movement of the operating rod is transmitted to the other rod by a resilient connection which comprises two coil springs mounted in opposition in the cylinder, on either side of a projection integral with the rod with respect to which the cylinder is adapted to slide. These springs are in fact disposed between the ends of the cylinder and rings movable with respect to the aforesaid projection and adapted to be applied against the said projection or against an abutment connected to the cylinder. When the cylinder is moved axially by the operating rod, the rod connected to the afore-said cam remains stationary as long as a locking device by which the said cam is held fast is engaged in its locking position. The cam is released during the de-clutching of the clutch mechanism owing to a mechanical connection between the said locking device and the member employed to effect the de-clutching.

The present invention has for its object to provide an arrangement for controlling the variable-speed mechanism, which is simpler, lighter, more compact and easier to maintain than the preceding arrangement.

To this end, in the arrangement according to the invention the aforesaid operating member is a bar which can be rotated about its axis by the user and which, at the instant when the aforesaid locking device is disengaged from its locking position, can set in rotation another bar on which the aforesaid cam is keyed, through the intermediary of a spring of which one extremity is adapted to rotate together with one of the bars, while the other extremity thereof is connected to an outfit adapted to rotate about the other bar and abutting against a member connected to the latter bar.

In other words, the aforesaid spring must be able to exert a torsional couple on the bar supporting the cam when it is tensioned by the movement of the operating bar. The said spring may be constituted, for example, by a spiral spring, a blade spring, a coil spring subjected to a rotational action, a sleeve or a rod of resilient material such as rubber.

By the direct mounting of the aforesaid cam on a bar forming part of the arrangement according to the invention and adapted to rotate under the control of the aforesaid spring, which is itself tensioned by rotation of the operating bar, any complication of parts due to multiple mechanical connections between the output end of the arrangement according to the invention and the cam is advantageously removed.

In an advantageous form of embodiment, the arrangement according to the invention comprises two springs mounted in opposition and connected to a casing integral with one of the bars and comprising abutments for two rotatable outfits disposed on either side of a projection on that one of the two bars on which the casing is not keyed, the said movable outfits being urged by the opposing springs connected individually to each of them, towards the aforesaid abutments which are so disposed as to maintain constant the tension of one of the two opposing springs, while the tension of the other spring varies upon any relative angular displacement between the two aforesaid bars.

In order to ensure rapid completion of the positioning of the parts of the variable-speed mechanism in spite of the passive resistances, which may be considerable at the end of the engagement stroke of these parts, the two aforesaid opposing springs are fitted with an initial tension. Consequently, at the end of the aforesaid engagement stroke, the spring which effects the engagement still has a certain tension, while the spring mounted in opposition is neutralised by the abutment of the casing co-operating with the movable outfit to which the latter spring is connected. The cam is therefore rapidly and forcefully displaced until the end of the desired movement, and should it tend to move beyond the end of its proper path its movement would immediately be strongly opposed by the spring which is mounted, also with initial tension, in opposition to that by which it has been displaced, while the action of the latter spring, would at the same time be neutralised by the corresponding abutment of the casing acting on the movable outfit to which this spring is connected.

Since it may be of advantage to prevent the user from shifting the operating bar from any given position in the direction of an increase of the speed, as far as the position corresponding to the speed ratio which follows that which is nearest the ratio at the start, the casing is provided with a third abutment which is so disposed that the operating bar is stopped when it is shifted in the direction corresponding to an increase in speed, beyond the position corresponding to the speed stage next to that from which the movement was commenced, before it has covered an angular distance equal to that separating any two non-adjacent stages. Thus, the user is obliged actually to employ all the successive speed stages when he desires to increase the speed of the driven shaft.

In a preferred form of embodiment, the aforesaid springs are spirally coiled.

Further features and details of the invention will appear during the course of the description of the drawings accompanying the present specification, which show diagrammatically, merely by way of example, a number of forms of embodiment of the arrangement according to the invention.

Figure 1 is a vertical section on the line I—I of Figure 2 through a variable-speed mechanism and a clutch mechanism employed with the control arrangement according to the invention.

Figure 2 is a side view in the direction of the arrow R of Figure 1.

Figure 3 is a fragmentary view in perspective of a form of construction of the control arrangement according to the invention, the various elements of which have been shown spaced apart in order that the details thereof may be more clearly seen, this view corresponding to the angular position of the elements for the transmission of the movement for the third speed ratio.

Figure 4 is a sectional view on the line IV—IV of Figure 2, this view showing the elements in the position which they occupy when the variable-speed mechanism is in the neutral position.

Figures 5 to 8 show various angular positions of the cam illustrated in Figure 4, for the first, second, third and fourth speed respectively.

Figure 9:
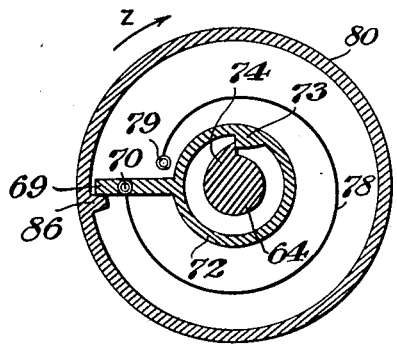
Figures 9 and 10 illustrate diagrammatically the position occupied by certain elements of the arrangement according to the invention as shown in the preceding Figures, this position corresponding to the position of the operating lever as shown in Figure 3.
Figure 10:
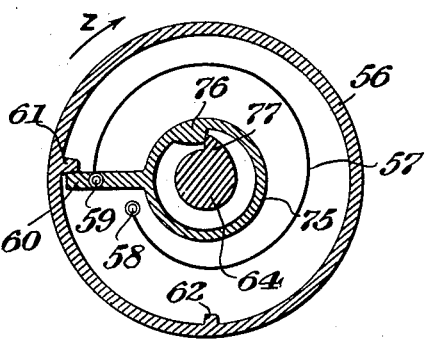

Figures 11 and 12, and 13 and 14 show the same elements as Figures 9 and 10, during the preparation for and the setting-up of the fourth speed.

Figure 15:
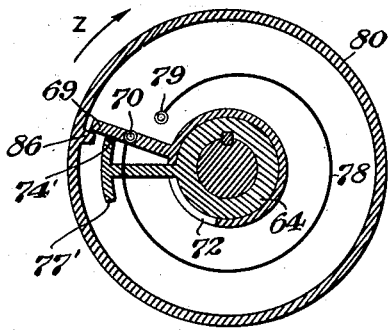
Figure 16:
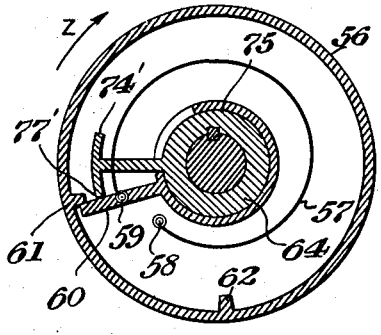

Figures 15 and 16 show diagrammatically a variant of the arrangement according to the invention in a manner similar to that proposed for Figures 9 and 10.

Figures 17 and 18, and 19 and 20 show diagrammatically two other variants of the arrangement according to the invention in a manner similar to that proposed for Figures 9 and 10.

Figure 21 is a diagrammatic plan view showing the mechanism for effecting the de-clutching and the unlocking by means of which the speed-changing is rendered possible.

In these various figures, similar references designate identical elements.

In Figure 1, 2 is a driving shaft on which a plate 3 is keyed by means of a key 4. Formed in the said plate are recesses 5 for springs 6 which bear against a plate 7 rotated by the plate 3 but adapted to be displaced axially with respect to the latter plate. The plate 7 is separated from a ring 8 in rotational engagement with the plate 3 by a clutch disc 9 provided with friction linings 10. The clutch disc 9 is in rotational engagement with a shaft 11.

A rod 12 sliding in the shaft 11 is arranged to be displaced in the direction of the arrow X by the thrust exerted on one of its extremities by a ball-thrust bearing 14 mounted in a sleeve 13 and actuated by a roller-supporting rod 13, on which act the two arms of a fork 194 which will hereinafter be described. The mechanism producing the displacement of the said rod 13 will be described at a later stage. When the rod 12 is forced in the direction of the arrow X, the plate 7 is maintained at a distance from the clutch disc 9 and the shaft 11 is disengaged. Immediately the thrust in the direction of the arrow X ceases to be exerted, the springs 6 force the plate 7 against the clutch disc 9 and the said clutch disc is set in rotation by locking of its friction linings 10 between the ring 8 and the plate 7.

The shaft 11 constituted the input shaft of a variable-speed mechanism, the output member of which is constituted by a coaxial sleeve 15 supporting a sprocket wheel 16 and adapted to turn freely with respect to the shaft 11. Mounted on the shaft 11 is a sliding pinion 17 (Figures 1 and 3) having lateral sets of teeth 18 and 19. In the position shown, these sets are not in engagement with any other set of teeth. The sliding pinion 17 is rotated with the shaft 11 by the aid of ribs 20, but it can be displaced parallel to the axis of the shaft in the direction of the double arrow Y so that its lateral teeth 18 may be brought into engagement with the lateral teeth 21 of a toothed wheel 22 mounted loose on the shaft 11 or so that its other lateral teeth 19 may be brought into engagement with the lateral teeth 23 of a toothed wheel 24 connected to the sleeve 15. The reciprocating displacement of the sliding pinion 17 in the direction of the double arrow Y can be brought about through the intermediary of a fork 25 (Figures 1 and 3) the two arms of which are engaged in a circular slot 26 in the sliding pinion. The movement of the fork 25 will be explained at a later stage.

Keyed on the shaft 11 is a pinion 27 meshing with a toothed wheel 28 which is mounted loose on a lay shaft 29. The latter shaft has ribs 30 along which a sliding pinion 31 (Figures 1 and 3) can be moved in the direction of the double arrow Y, the said sliding pinion rotating the shaft 29 by means of these ribs. This pinion meshes with the toothed wheel 22, which is mounted loose on the shaft 11. It has two lateral sets of teeth 32 and 33. In the position illustrated, these two lateral sets of teeth are not engaged with any other set of teeth. The teeth 32 can be brought into engagement with lateral teeth 34 of the toothed wheel 28, while the lateral teeth 33 can be brought into engagement with lateral teeth 35 of another toothed wheel 36 mounted loose on the shaft 29. This other toothed wheel also meshes with the sliding pinion 17. The displacement of the sliding pinion 31 in the direction of the double arrow Y is effected through the intermediary of a fork 37 (Figures 1 and 3), the displacement of which will later be explained. Keyed on the shaft 29 is a toothed wheel 38 which meshes constantly with the toothed wheel 24.

When the two sliding pinions 17 and 31 are in the position shown, no movement is transmitted to the output sleeve 15. If the sliding pinion 31 is displaced to the right so that its lateral teeth 32 are in mesh with the lateral teeth 34, the transmission of the rotational movement of the shaft 11 is effected through the intermediary of the pinion 27, the toothed wheel 28, the sliding pinion 31, the shaft 29 and the toothed wheels 38 and 24. The speed ratio between the shaft 11 and the sleeve 15 then corresponds to that called the first speed.

If the sliding pinion 31 is returned into the position in which it is shown, while the sliding pinion 17 is displaced to the left so that its lateral teeth 19 are in mesh with the lateral teeth 23, the transmission of the rotational movement of the shaft 11 to the sleeve 15 is effected through the intermediary of the sliding pinion 17 and of the toothed wheel 24. This transmission corresponds to the second speed.

If the sliding pinion 17 is returned into the position in which it is shown, while the sliding pinion 31 is displaced to the left so that its lateral teeth 33 are in mesh with the lateral teeth 35, the transmission of the rotational movement of the shaft 11 to the sleeve 15 is effected through the intermediary of the sliding pinion 17, the toothed wheel 36, the sliding pinion 31, the shaft 29 and the toothed wheels 38 and 24. The speed ratio then corresponds to the third speed.

If the sliding pinion 31 is returned into the position in which it is shown, while the sliding pinion 17 is displaced to the right so that its lateral teeth 18 are in mesh with the lateral teeth 21, the transmission of the rotational movement of the shaft 11 to the sleeve 15 is effected through the intermediary of the sliding pinion 17, the toothed wheel 22, the sliding pinion 31, the shaft 29 and the toothed wheels 38 and 24. The speed ratio then corresponds to the fourth speed.

The displacement of the sliding forks 25 and 37 in the direction of the double arrow Y is effected along a rod 39 (Figures 3 and 4) under the control of a rotary cam 40 hollowed out of a plate 41, which cam is engaged by pins 42 and 43 connected to the forks 25 and 37. The cam-plate 41 has in its periphery a number of notches 44 to 44'''', which can take up a position opposite a locking member 45 which holds the cam plate 41 fast and consequently secures the forks 25 and 37 in different positions.

In Figure 4, the cam is shown in the position corresponding to the neutral point of the variable-speed mechanism, this position corresponding to that of the sliding pinions 17 and 31 shown in Figure 1. In Figures 5, 6, 7 and 8, the cam is shown in the position which it occupies in the case of the first, the second, the third and the fourth speed respectively. The pins 42 and 43 are shown in dot and dash lines in each of these figures in order to show diagrammatically the relative position of the forks 25 and 37 and consequently of the sliding pinions 17 and 31 of Figure 1.

To prepare the position to be occupied by the cam, before the instant of the de-clutching during which the change of position takes place, the lever 46 (Figure 3) is actuated and imparts rotation to an operating bar 47 constituted, for example, by a tube and extending through the centre of a circular sector 48. The lever 46 is in rotational engagement with the bar 47 through a fork 46' keyed on the shaft 47 and a pivot 46'' which joins the fork 46' to the base 46''' of the lever 46 and permits the articulation of the said lever in the fork 46'. The lever 46 is adapted to move opposite a sector 48 having a number of notches 49 to 49'''', in each of which a nose-piece 50 provided on the lever 46 can be held under the action of a spring 51, which the user must overcome in order to free the nose-piece 50 from one of the notches 49 to 49''''. A sleeve 52 is keyed on the operating bar 47 with the aid of a pin 53 passed into holes 54 and 55 formed in the sleeve 52 and in the bar 47 respectively. The sleeve 52 is connected to a plate 56 forming part of a casing, together with other elements which will hereinafter be described. The inner extremity of a spirally coiled spring 57 is connected to an edge 58 of the plate 56, while the outer extremity of the said spring is connected to a pin 59 connected to an arm 60 which is adapted to pivot about the geometrical axis of the bar 47. The spring 57 is tensioned during fitting. Under the action of this initial tension, the arm 60 is held against an abutment 61 provided on the plate 56 forming part of the casing (Figure 3).

The plate 56 also comprises an abutment 62 situated to the rear of the arm 60 with respect to the direction of rotation Z of the operating bar corresponding to a stepping-up of the speeds. The angular position of this abutment 62 will be defined at a later stage. Engaged in the tube 47 constituting the operating bar is the extremity 63 of a member 64, the other extremity 65 of which comprises a nose-piece 66 engaging a notch 67 formed in a tube 68 supporting the plate 41 out of which the cam slot 40 is hollowed. The said member 64 is therefore in rotational engagement with the tube 68 and the cam plate 41. The arm 60 is mounted on the member 64 in such a manner as to be able to pivot with respect thereto. The same is the case with an arm 69 provided with a pin 70. The two arms 60 and 69 are maintained in spaced relationship to one another by a ring 71 drawn in dot-dash lines. The boss 72 of the arm 69 has an internal projection 73 adapted to abut against a projection 74 of the member 64. The boss 75 of the arm 60 also has an internal projection 76 adapted to abut against a projection 77 of the member 64. Under the action of the tension of the spiral spring 57, the internal projection 76 tends to be constantly forced against the projection 77. Similarly, the internal projection 73 tends to be forced constantly against the projection 74 under the action of another spirally coiled spring 78, the outer extremity of which is secured to the pin 70 of the arm 69, while its inner extremity is connected to an edge 79 of a plate 80 forming part of the same casing as the plate 56. The spiral spring 78, which is also tensioned during fitting, is coiled in the opposite direction to the spiral spring 57, so that the internal projections 73 and 76, as also the projections 74 and 77, are oppositely directed to one another. The two plates 56 and 80 forming part of the same casing are maintained at a suitable distance apart by means of distance pieces, one of which is shown at 81. These distance pieces are traversed by screws, one of which is shown at 82, the head 83 of the said screws being applied against one of the plates, while the screwthreaded extremity 84 receives a nut 85. The plate 80 also comprises an abutment 86, against which the arm 69 tends constantly to be maintained under the action of the spring 78.

The operation of the arrangement contained in the casing of which the plates 56 and 80 form part is diagrammatically illustrated in Figures 9 to 14. It will be assumed, for example, that the plates 56 and 80, the abutments 61 and 86, the arms 60 and 69, the springs 57 and 78, the internal projections 76 and 73 and the projections 77 and 74 are in the position shown in Figures 9 and 10 when the operating lever 46 shown in Figure 3 occupies the position in which it is shown in this latter figure, that is to say, that in which the third speed is established. It will further be assumed that this lever is shifted in the direction of the arrow Z, which corresponds to the stepping-up of the speeds, until its nose-piece is engaged in the notch 49'''' of the sector 48. During this displacement of the lever 46, the operating bar 47 carries along the casing of which the plate 80 forms part. The abutment 86 connected to the plate 80 moves the arm 69 until it reaches a position such as that shown in Figure 11. This displacement of the arm 69 is possible because the internal projection 73 can leave the projection 74, which remains stationary owing to the fact that the member 64 on which it is provided is held fast by the locking member 45 engaging the notch 44''' (Figure 7). The tension of the spring 78 remains constant during this displacement because its two extremities 79 and 70 carry out the same angular movement as the plate 80.

Figure 12:
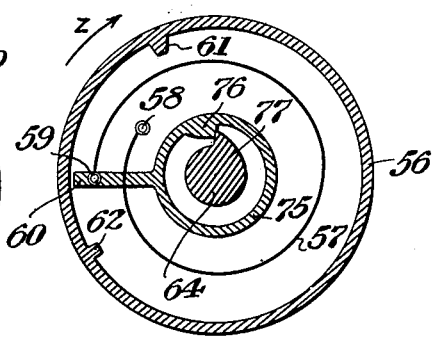

At the end of this movement of the lever 46, the abutment 61 provided on the plate 56 takes up a position such as that shown in Figure 12. The arm 60 remains in the same position as in Figure 10 because the internal projection 76, which is connected thereto, abuts against the projection 77 which is held fast at the same time as the member 64 and as the cam plate 41 of Figure 3 by the locking member 45. During this movement of the operating bar 47, the spring 57 is subjected to a supplementary tension since its extremity 58 has moved in the direction of the arrow Z, while its extremity 59 has remained in position.

At the instant when the cam plate 41 is released by the disengagement of the locking member 45 in the manner which will later be described, the spring 57 displaces the arm 60 in the direction of the arrow Z until the said arm is stopped by the abutment 61 (Figure 14), which is held fast owing to the engagement of the nose-piece 50 (Figure 3) in the notch 49''''. During this movement of the arm 60, the internal projection 76 drives the projection 77 and also the member 64 and the cam plate 41. The cam plate then takes up the position shown in Figure 8, in which the notch 44'''' has taken up a position opposite the locking member 45. The said locking member can enter the latter notch at the instant when the clutch of the variable-speed mechanism is engaged, in the manner which will hereinafter be described.

Figure 11:
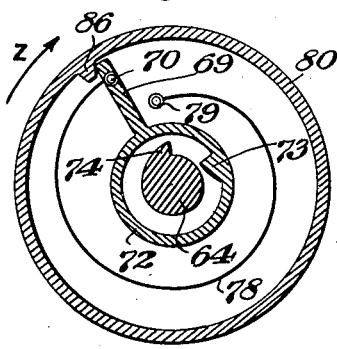
Figure 13:
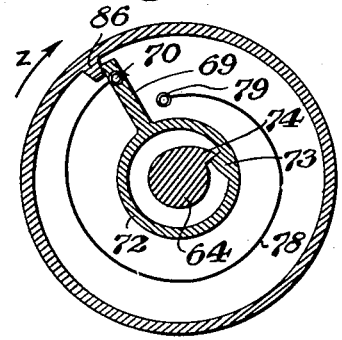
Figure 14:
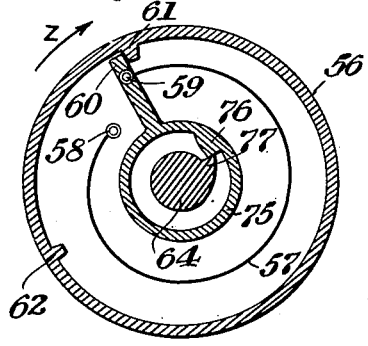

The expansion of the spring 57 from the position shown in Figure 12 to the position of Figure 14 has no effect on the tension of the spring 78, as may be seen by comparing Figures 11 and 13. In fact, the projection 74 of the member 64 simply returns into the position in which it is in contact with the internal projection 73 held fast by means of the boss 72, the lever 69, the abutment 86, the plate 80, the bar 47 (Figure 3), the lever 46 and the nose-piece 50 engaged in the notch 49''''.

If, instead of stepping up the speeds, it is desired to effect a stepping-down of the speeds, the operating lever 46 shown in Figure 3 is shifted in the direction opposite the arrow Z. As will readily be seen, this displacement would cause tensioning of the spring 78 and maintenance of the spring 57 under constant tension. The expansion of the spring 78 at the instant of the release of the cam plate 41 would bring this cam plate into a position corresponding to the required lower speed ratio.

In practice, no disadvantage would be involved if, during the stepping-down of the speeds, the speed were brought beyond the stage which is adjacent the speed stage from which the movement is commenced in order to reach directly another stage not adjacent that from which the movement is commenced. This is not so in the case of the stepping-up of the speeds, when the engine must run at a predetermined speed in order to generate the necessary power. If during the course of the stepping-up of the speeds, the user wishes to pass beyond the speed stage next to that from which he commences in order to employ the second higher stage, this operation, which is likely to harm the engine, will be prevented by the abutment 62. The said abutment is so disposed as to be stopped by the arm 60 which, under the action of the spring 57, has its internal projection 76 applied against the projection 77 integral with the cam plate 41, which is locked by the locking member 45. The angular position of the abutment 62 is such that it enables the user to shift the casing 56—80 by the angular distance separating any two adjacent stages (Figures 10 and 12), but that it prevents the casing from being displaced by the angular distance separating any two non-adjacent stages. Comparison of Figures 10 and 12 will show that the abutment 62 has remained to the rear of the arm 60 in the direction of the stepping-up of the speed indicated by the arrow Z. The angular distance between the said abutment 62 and the direction of the arm 60 of Figure 12 is smaller than the smallest angular displacement required to bring about any alteration of a speed ratio.

In the form of embodiment which has just been described, the projections 74 and 77 in rotational engagement with the bar 68 to which the aforesaid casing is not connected, are supported by the member 64, inside the bosses 72 and 75, to which the arms 69 and 60 are connected. The said projections could be situated outside the said bosses, for example as diagrammatically illustrated in Figures 15 and 16, in which the member 64 is seen to comprise a double projection 74'—77' outside the bosses 72 and 75 supporting the arms 69 and 60. The operation of this variant is in all respects identical to that of the preceding variant.

In these two variants, the casing comprising the plates 56 and 80 is connected to the operating arm 47. The arrangement according to the invention could also be employed with the casing connected to the bar 68 supporting the cam plate 41.

Figure 17:
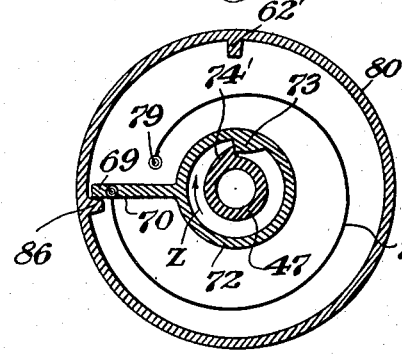
Figure 18:
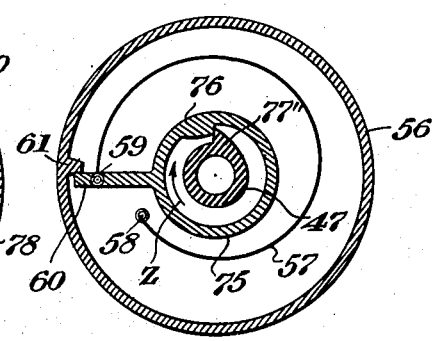

In a variant of this particular case which is diagrammatically illustrated in Figures 17 and 18, the various elements are arranged in a similar manner to the elements shown in Figures 9 and 10. However, it is to be noted that the projections 74" and 77", instead of being rigidly connected to the member 64 like the projections 74 and 77 of Figures 9 and 10, are connected to the operating bar 47. Consequently, the operation of this variant of the arrangement according to the invention differs slightly from that of the variant shown in Figures 9 and 10. In fact, when the operating bar 47 is actuated in the direction of the stepping-up of the speeds as shown by the arrow Z, the projection 74" drives the internal projection 73 and the corresponding arm 69, while the internal projection 77" moves away from the internal projection 76 connected to the arm 60 which is maintained in position by the abutment 61. As a result of this, it is the spring 78 which is tensioned instead of the spring 57 of Figures 9 and 10, the latter spring remaining under constant tension. At the instant when the cam plate is released by the disengagement of the locking member 45, the spring 78 causes rotation of the casing comprising the plates 80 and 56 in the direction of the arrow Z. During the expansion of the spring 78, the tension of the spring 57 continues to remain constant as was the case during the supplementary tensioning of the spring 78.

It is also to be noted that the projection 62' (instead of being disposed to the rear of the arm 69 as is the projection 62 of Figure 10 with respect to the arm 60) is disposed in front of this arm in order to stop it during its displacement in the direction of the arrow Z beyond the position corresponding to the speed stage adjacent that from which the movement was started, but before the following stage is reached.

As may be seen both from this variant and from that shown in Figures 9 and 10, the operating bar is stopped when it is displaced in a direction corresponding to a higher speed, beyond the position corresponding to the speed stage next to that from which the movement is commenced.

Figure 19:
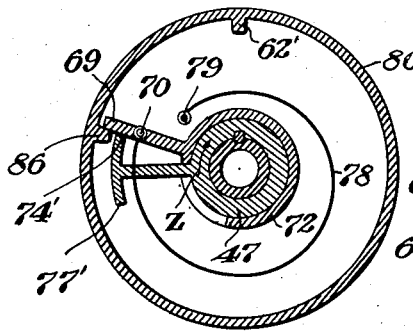
Figure 20:
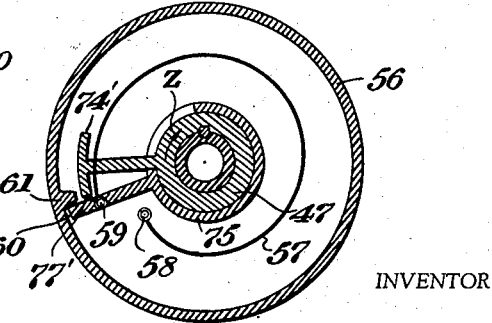

The variant shown in Figures 19 and 20 differs from that shown in Figures 15 and 16 in that the casing 56—80 is rigidly connected to the bar 68 supporting the cam and that the projections 74'—77' outside the bosses 72 and 75 are rigidly connected to the operating bar 47. In addition, as in the form of embodiment shown in Figures 17 and 18, the projection 62' is disposed in front of the arm 69 when the operating bar is shifted in the direction of the stepping-up of the speeds. The operation of this latter arrangement is the same as that of Figures 17 and 18.

To effect the disengagement of the locking device 45 at the same time as the de-clutching of the clutch disc 9 is produced, the user displaces in the direction of the arrow A a cable 100 contained in a sheath 101 (Figures 2 and 21) which is axially fixed. This cable 100 is secured to an arm 102 keyed on a pivot 103. Also keyed on the said pivot are a fork 104 and another arm 105. The fork 104 thus acts in opposition to the rollers mounted on the rod 13, which was previously referred to, while the arm 105 is secured to a cable 106 lodged in a sheath 107 and ending at the locking member 45 (Figure 4). It will be seen that the displacement of the cable 100 in the direction of the arrow A (Figure 21) produces the displacement of the rods 12 and 13 in the direction of the arrow X (Figure 1), which brings about the de-clutching, and the displacement of the cable 106 in the direction of the arrow B (Figures 21 and 4), which lifts the locking member and releases the cam plate 41.

As will have been understood especially upon consideration of Figures 1 and 3, the arrangement according to the invention may be disposed against the casing of the variable-speed mechanism. It may also be disposed within the said casing.

What I claim is:

1. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which a part of said member rests in contact, a member for controlling the declutching of the aforesaid clutch mechanism, a locking member for said cam, a mechanical connection between said locking member and the de-clutching control member such that said locking member is disengaged from its locking position at the instant when declutching takes place, a rocking bar on which said cam is keyed, a second bar having the same axis as said rocking bar and rotatable about its axis by the operator for preparing the speed change, movable elements rotatable about one of said bars, a spring having one extremity which rotates with the bar about which said movable elements do not rotate while the other extremity thereof is connected to said movable elements, and an abutment mounted on the bar about which said movable elements do not rotate, against which the latter abuts under the action of said spring when the other bar is rotated.

2. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which a part of said member rests in contact, a member for controlling the de-clutching of the aforesaid clutch mechanism, a locking member for said cam, a mechanical connection between said locking member and the declutching control member such that said locking member is disengaged from its locking position at the instant when the declutching takes place, a rocking bar on which said cam is keyed, another bar with the same axis as said rocking bar and which can be rotated about its axis by the operator for preparing the speed change, a casing rigidly connected with only one of said bars, two rotatable assemblies adapted to independently rotate about the bar to which said casing is not rigidly connected, a first projection on that one of the two bars to which the casing is not rigidly connected, said first projection being disposed in such a manner as to prevent the rotation of one rotatable assembly in one direction, a second projection on the same bar, said second projection being disposed in such a manner as to prevent the rotation of the other rotatable assembly in the opposite direction, a spring having one extremity which is connected to said casing while the other extremity thereof is connected to one of said rotatable assemblies, another spring mounted in opposition to the first one and one extremity of which is connected to said casing while the other extremity thereof is connected to the other of said rotatable assemblies, and two abutments towards which said rotatable assemblies are individually urged by the corresponding springs, said abutments being mounted on said casing in such a manner as to maintain constant the tension of one of the two opposing springs while the tension of the other spring varies upon any relative angular displacement between the two aforesaid bars.

3. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which a part of said member rests in contact, a member for controlling the declutching of the aforesaid clutch mechanism, a locking member for said cam, a mechanical connection between said locking member and the declutching control member such that said locking member is disengaged from its locking position at the instant when the declutching takes place, a rocking bar on which said cam is keyed, another bar with the same axis as said rocking bar and which can be rotated about its axis by the operator for preparing the speed change, a casing rigidly connected with only one of the said bars, two rotatable assemblies adapted to independently rotate about the bar to which said casing is not rigidly connected, a first projection on that one of the two bars to which the casing is not rigidly connected, said first projection being disposed in such a manner as to prevent the rotation of one rotatable assembly in one direction, a second projection on the same bar, said second projection being disposed in such a manner as to prevent the rotation of the other rotatable assembly in the opposite direction, a spring one extremity of which is connected to said casing while the other extremity thereof is connected to one of said rotatable assemblies, another spring mounted in opposition with the first one and one extremity of which is connected to said casing while the other extremity thereof is connected to the other of said rotatable assemblies, and two abutments towards which said rotatable assemblies are individually urged by the corresponding springs, said abutments being mounted on said casing in such a manner as to maintain constant the tension of one of the two opposing springs while the tension of the other spring varies upon any relative angular displacement between the two aforesaid bars, said opposing springs being fitted with initial tension.

4. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which a part of said member rests in contact, a member for controlling the de-clutching of the aforesaid clutch mechanism, a locking member for said cam, a mechanical connection between said locking member and the de-clutching control member such that said locking member is disengaged from its locking position at the instant when the de-clutching takes place, a rocking bar on which said cam is keyed, another bar with the same axis as said rocking bar and which can be rotated about its axis by the user for preparing the speed change, a casing rigidly connected with only one of said bars, two rotatable assemblies adapted to independently rotate about the bar to which said casing is not rigidly connected, a first projection on that one of the two bars to which the casing is not rigidly connected, said first projection being disposed in such a manner as to prevent the rotation of one rotatable assembly in one direction, a second projection on the same bar, said second projection being disposed in such a manner as to prevent the rotation of the other rotatable assembly in the opposite direction, a spring having one extremity which is connected to said casing while the other extremity thereof is connected to one of said rotatable assemblies, another spring mounted in opposition with the first one and one extremity of which is connected to said casing while the other extremity thereof is connected to the other of said rotatable assemblies, two abutments towards which said rotatable assemblies are individually urged by the corresponding springs, said abutments being mounted on said casing in such a manner as to maintain constant the tension of one of the two opposing springs while the tension of the other spring varies upon any relative angular displacement between the two aforesaid bars, and a third abutment on said casing for one of said rotatable assemblies so disposed as to stop the preparing bar when the latter is displaced in the direction corresponding to a higher speed, beyond the position corresponding to the speed stage adjacent that from which the movement is started and before it has travelled through an angular distance equal to that separating any two non-adjacent stages.

5. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which a part of said member rests in contact, a member for controlling the de-clutching of the aforesaid clutch mechanism, a locking member for said cam, a mechanical connection between said locking member and the de-clutching control member such that said locking member is disengaged from its locking position at the instant when the de-clutching takes place, a rocking bar on which said cam is keyed, another bar with the same axis as said rocking bar and which can be rotated about its axis by the user for preparing the speed change, a casing rigidly connected with only one of said bars, two arms adapted to independently pivot about the bar to which said casing is not rigidly connected, a boss fixed to each of said arms, an internal projection mounted on each boss, two projections on that one of the two bars to which said casing is not rigidly connected, situated on the travel of said internal projections, one of the projections on the last bar being disposed on one side of one of said internal projections while the other projection on this bar is disposed on the other side of the other internal projection, a spring having one extremity which is connected to said casing while the other extremity thereof is connected to one of said pivoting arms, another spring mounted in opposition with the first one and one extremity of which is connected to said casing while the other extremity thereof is connected to the other of said pivoting arms, and two abutments towards which said pivoting arms are individually urged by the corresponding springs, said abutments being mounted on said casing in such a manner as to maintain constant the tension of one of the two opposing springs while the tension of the other spring varies upon any relative angular displacement between the two aforesaid bars.

6. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which part of said member rests in contact, a member for controlling the de-clutching of the aforesaid clutch mechanism, a locking member for said cam, a mechanical connection between said locking member and the de-clutching control member such that said locking member is disengaged from its locking position at the instant when the de-clutching takes place, a rocking bar on which said cam is keyed, another bar with the same axis as said rocking bar and which can be rotated about its axis by the user for preparing the speed change, a casing rigidly connected to the preparing bar, two arms adapted to independently pivot about the bar on which said cam is keyed, two projections on this bar, so disposed as to serve as abutments for said arms when they pivot, one of said projections being disposed so as to limit the pivoting of one arm in one direction while the other projection is disposed so as to limit the pivoting of the other arm in the opposite direction, a spring having one extremity which is connected to said casing while the other extremity thereof is connected to one of said pivoting arms, another spring mounted in opposition to the first one and one extremity of which is connected to said casing while the other extremity thereof is connected to the other of said pivoting arms, and two abutments towards which said pivoting arms are individually urged by the corresponding springs, said abutments being mounted on said casing in such a manner as to maintain constant the tension of one of the two opposing springs while the tension of the other spring is increased by the angular displacement of the casing.

7. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which a part of said member rests in contact, a member for controlling the de-clutching of the aforesaid clutch mechanism, a locking member for said cam, a mechanical connection between said locking member and the declutching control member such that said locking member is disengaged from its locking position at the instant when the declutching takes place, a rocking bar on which said cam is keyed, another bar with the same axis as said rocking bar and which can be rotated about its axis by the user for preparing the speed change, a casing rigidly connected to the preparing bar, two arms adapted to independently pivot about the bar on which said cam is keyed, two projections on this last bar, so disposed so as to serve as abutment for said arms when they pivot, one of said projections being disposed so as to limit the pivoting of one arm in one direction while the other projection is disposed so as to limit the pivoting of the other arm, in the opposite direction, a spring having one extremity which is connected to said casing while the other extremity thereof is connected to one of said pivoting arms, another spring mounted in opposition to the first one and one extremity of which is connected to said casing while the other extremity thereof is connected to the other of said pivoting arms, two abutments towards which said pivoting arms are individually urged by the corresponding springs, said abutments being mounted on said casing in such a manner as to maintain constant the tension of one of the two opposing springs while the tension of the other spring varies upon any relative angular displacement between the two aforesaid bars, and a third abutment on said casing so disposed so as to be stopped, when the preparing bar is displaced in the direction corresponding to the higher speed stage adjacent that from which the movement is started and before it has travelled through an angular distance equal to that separating any two non-adjacent stages, by that one of the two aforesaid pivoting arms which during said deplacement of the preparing bar in the direction corresponding to the higher speed stage is stopped by one of said projections in spite of the action of the spring whose tension is increased by said displacement of the preparing bar.

8. An arrangement for the control of a variable speed mechanism which is disposed between a clutch mechanism and a driven shaft and which comprises at least one sliding pinion, comprising a member with a reciprocating motion connected directly to said pinion, a cam in a plane parallel to said reciprocating motion with which a part of said member rests in contact, a member for controlling the de-clutching of the aforesaid clutch mechanism, a locking member for said cam, a mechanical connection between said locking member and the declutching control member such that said locking member is disengaged from its locking position at the instant when the declutching takes place, a rocking bar on which said cam is keyed, another bar with the same axis as said rocking bar and which can be rotated about its axis by the user for preparing the speed change, a casing rigidly connected with only one of said bars, two rotatable assemblies adapted to independently rotate about the bar to which said casing is not rigidly connected, a first projection on that one of the two bars to which the casing is not rigidly connected, said first projection being disposed in such a manner as to prevent the rotation of one rotatable assembly in one direction, a second projection on the same bar, said second projection being disposed in such a manner as to prevent the rotation of the other rotatable assembly in the opposite direction, a spirally coiled spring one extremity of which is connected to said casing while the other extremity thereof is connected to one of said rotatable assemblies, another spirally coiled spring mounted in opposition to the first one and one extremity of which is connected to said casing while the other extremity thereof is connected to the other of said rotatable assemblies, and two abutments towards which said rotatable assemblies are individually urged by the corresponding spirally coiled springs, said abutments being mounted on said casing in such a manner as to maintain constant the tension of one of the two opposing spirally coiled springs while the tension of the other spirally coiled spring varies upon any relative angular displacement between the two aforesaid bars.

FRANÇOIS PIERRE JOSEPH
HECTOR DUMONT.

REFERENCES CITED

The following references are of record in the file of this patent:

UNITED STATES PATENTS

| Number | Name | Date |
|---|---|---|
| 1,993,454 | Peterson | Mar. 5, 1935 |

FOREIGN PATENTS

| Number | Country | Date |
|---|---|---|
| 171,663 | Switzerland | Dec. 1, 1935 |
| 339,964 | Germany | Aug. 25, 1921 |
| 435,028 | Great Britain | Sept. 11, 1935 |
| 782,351 | France | June 4, 1935 |